(12) United States Patent
Mukherji (10) Patent No.: US 11,135,788 B2
(45) Date of Patent: Oct. 5, 2021

(54) SYSTEM OF CONTINUOUS PULTRUSION METHOD FOR MANUFACTURING OF BIO-COMPOSITE PRODUCTS; PROCESS AND PRODUCTS THEREOF

(71) Applicant: SP ADVANCED ENGINEERING MATERIALS PVT. LTD., Mumbai (IN)

(72) Inventor: Arindam Mukherji, Mumbai (IN)

(73) Assignee: SP Advanced Engineering Materials Pvt. Ltd., Mumbai (IN)

( * ) Notice: Subject to any disclaimer, the term of this patent is extended or adjusted under 35 U.S.C. 154(b) by 246 days.

(21) Appl. No.: 15/769,850

(22) PCT Filed: Oct. 19, 2016

(86) PCT No.: PCT/IN2016/050357
§ 371 (c)(1),
(2) Date: Apr. 20, 2018

(87) PCT Pub. No.: WO2017/068602
PCT Pub. Date: Apr. 27, 2017

(65) Prior Publication Data
US 2018/0311915 A1  Nov. 1, 2018

(30) Foreign Application Priority Data

Oct. 21, 2015  (IN) .......................... 3985/MUM/2015

(51) Int. Cl.
*B29C 70/52* (2006.01)
*B29C 70/08* (2006.01)
(Continued)

(52) U.S. Cl.
CPC .......... *B29C 70/521* (2013.01); *B29C 70/081* (2013.01); *B29C 70/523* (2013.01);
(Continued)

(58) Field of Classification Search
CPC ... B29C 70/081; B29C 70/521; B29C 70/523; B29C 70/528; B29D 99/0033;
(Continued)

(56) References Cited

U.S. PATENT DOCUMENTS

2005/0013984 A1  1/2005  Dijk et al.
2011/0204611 A1  8/2011  Ziegler et al.

FOREIGN PATENT DOCUMENTS

DE      102 51 518 A1    5/2004
GB        2 082 112 A    3/1982
WO   WO 2012/103929 A2   8/2012

OTHER PUBLICATIONS

International Search Report of PCT Application No. PCT/IN2016/050357, dated Mar. 13, 2017.

*Primary Examiner* — Camie S Thompson
(74) *Attorney, Agent, or Firm* — Ryan Alley IP (57) ABSTRACT

Bio-composite pultruded products (100, 104, 107, 110, 114, 117) either in "I" profile or "Plate" profile of higher cross sectional area where said products consisting essentially natural fibres selected from hemp, jute, sisal and. flex as core impregnated with a resin system comprise of at least one resin, curing system comprising a curing agent and an accelerator, a filler, a thinner, pigment or any other additives; encapsulated between bi-directionally and/or uni-directionally oriented synthetic fabric selected from polyester, carbon, aramid, glass, basalt and mixtures thereof impregnated with said resin system are provided. in another bio-composite pultruded products either of "I" profile or "Plate" profile of higher cross sectional area where said products consisting of plank of short fibers bagasse premixed with the said resin system as core is enclosed between the natural fibers selected from hemp, jute, sisal and flex impregnated with the resin system which is further enclosed between bi-directionally and/or uni-directionally oriented synthetic fabric
(Continued)

selected from polyester, carbon, aramid, glass, basalt and mixtures thereof impregnated with the resin system. The system and method for the preparations of said bio-composite pultruded products, are also illustrated herein. These products lead to a significant reduction in weight and reduction in density with higher stiffness and bending strength. The present bio-composite products are encapsulated by fabrics in the peripheral area brings more integrity uniformity of jute materials. This leads to a significant cost reduction in a without sacrificing much tensile strength.

13 Claims, 4 Drawing Sheets (51) Int. Cl.
| | | |
|---|---|---|
| B29D 99/00 | (2010.01) | |
| B32B 5/00 | (2006.01) | |
| B32B 3/04 | (2006.01) | |
| B32B 19/02 | (2006.01) | |
| B32B 27/28 | (2006.01) | |
| B32B 27/30 | (2006.01) | |
| B32B 27/38 | (2006.01) | |
| E04C 3/29 | (2006.01) | |
| B32B 27/40 | (2006.01) | |
| E04C 3/28 | (2006.01) | |
| B32B 5/26 | (2006.01) | |
| B32B 19/04 | (2006.01) | |
| B32B 27/08 | (2006.01) | |
| B32B 5/02 | (2006.01) | |
| B32B 27/34 | (2006.01) | |
| B32B 7/04 | (2019.01) | |
| B32B 27/42 | (2006.01) | |
| B32B 19/06 | (2006.01) | |
| B32B 27/36 | (2006.01) | |
| B32B 27/20 | (2006.01) | |
| B32B 27/26 | (2006.01) | |
| B32B 27/32 | (2006.01) | |
| B29K 201/00 | (2006.01) | |
| B29K 309/08 | (2006.01) | |
| B29L 7/00 | (2006.01) | |
| B29L 31/00 | (2006.01) | |

(52) U.S. Cl.
CPC ........ *B29C 70/528* (2013.01); *B29D 99/0003* (2013.01); *B32B 3/04* (2013.01); *B32B 5/00* (2013.01); *B32B 5/022* (2013.01); *B32B 5/26* (2013.01); *B32B 7/04* (2013.01); *B32B 19/02* (2013.01); *B32B 19/045* (2013.01); *B32B 19/06* (2013.01); *B32B 27/08* (2013.01); *B32B 27/20* (2013.01); *B32B 27/26* (2013.01); *B32B 27/28* (2013.01); *B32B 27/281* (2013.01); *B32B 27/302* (2013.01); *B32B 27/32* (2013.01); *B32B 27/34* (2013.01); *B32B 27/36* (2013.01); *B32B 27/38* (2013.01); *B32B 27/40* (2013.01); *B32B 27/42* (2013.01); *E04C 3/28* (2013.01); *E04C 3/29* (2013.01); *B29K 2201/00* (2013.01); *B29K 2309/08* (2013.01); *B29L 2007/002* (2013.01); *B29L 2031/001* (2013.01); *B32B 2250/02* (2013.01); *B32B 2250/03* (2013.01); *B32B 2260/023* (2013.01); *B32B 2260/046* (2013.01); *B32B 2262/0269* (2013.01); *B32B 2262/0276* (2013.01); *B32B 2262/065* (2013.01); *B32B 2262/10* (2013.01); *B32B 2262/101* (2013.01); *B32B 2262/106* (2013.01); *B32B 2262/14* (2013.01); *B32B 2264/104* (2013.01); *B32B 2270/00* (2013.01); *B32B 2307/308* (2013.01); *B32B 2307/54* (2013.01); *B32B 2307/558* (2013.01); *B32B 2307/71* (2013.01); *B32B 2307/718* (2013.01); *B32B 2307/72* (2013.01); *B32B 2419/00* (2013.01); *B32B 2605/08* (2013.01)

(58) Field of Classification Search
CPC ............ B29K 2201/00; B29K 2309/08; B29L 2007/002; B29L 2031/00; E04C 3/29; B32B 19/02; B32B 19/045; B32B 2250/02; B32B 2250/03; B32B 2260/023; B32B 2260/046; B32B 2262/0276; B32B 2262/065; B32B 2262/10; B32B 2262/101; B32B 2262/106; B32B 2262/14; B32B 27/28; B32B 27/281; B32B 27/302; B32B 27/32; B32B 27/34; B32B 27/36; B32B 27/40; B32B 27/42; B32B 3/04; B32B 5/00; B32B 5/022; B32B 5/26; B32B 7/04
USPC ......... 428/292.4, 114; 264/137, 136, 211.12, 264/258; 156/242, 433, 181, 361, 583.1
See application file for complete search history.

SYSTEM OF CONTINUOUS PULTRUSION METHOD FOR MANUFACTURING OF BIO-COMPOSITE PRODUCTS; PROCESS AND PRODUCTS THEREOF

CROSS-REFERENCE TO RELATED APPLICATIONS

This application is a National Phase Application of PCT International Application No. PCT/IN2016/050357, International Filing Date Oct. 19, 2016, which claims priority from Indian Patent Application No. 3985/MUM/2015, filed Oct. 21, 2015, which is hereby incorporated by reference.

This application claims priority from Indian Patent Application No. 3985/MUM/2015 filed on Oct. 21, 2015.

FIELD OF INVENTION

The present invention relates to a system of continuous pultrusion production of a bio-composite pultruded product; wherein the system is totally enclosed thereby eliminating wastage of material due to spilling of raw material during the manufacture thus making it clean, cost effective and efficient.

It also relates to a continuous pultrusion method for production of the bio-composite pultruded product; wherein the method uses low-cost natural fibres as core and encapsulated between bi-directionally and uni-directionally oriented synthetic fabric thereby reducing manufacturing cost, reducing environmental impact and improving bio-composite product and can be used as efficient structural beam or plate or panel in a modular structure.

It also relates to the bio-composite pultruded product consisting essentially low-cost natural fibres impregnated with resin system as core encapsulated between bi-directionally and uni-directionally oriented synthetic fabric impregnated with resin system; thereby improving the bio-composite products and can be used as a high strength reinforcing filler, efficient structural beam or plate or panel in a modular structure, making low-cost product and reducing environmental impact.

It also relates to the bio-composite pultruded products consisting essentially low-cost bagasse plank as a core encapsulated between bi-directionally and uni-directionally natural fibres and oriented synthetic fabric; both impregnated with resin system; thereby improving the bio-composite products and can be used as a high strength reinforcing filler, efficient structural beam or plate or panel in a modular structure, making low-cost product and reducing environmental impact.

More particularly, the bio-composites products of the invention are adapted to be used as shuttering Plywood, I beam and Plate beam for civil application.

BACKGROUND OF THE INVENTION

Fiber reinforced polymer (FRP) composites have surpassed their initial target applications in the aerospace industry to become a viable material alternative in sporting goods, automotive, and construction industries. High performance FRP composites made with synthetic fibers such as carbon, glass or aramid embedded in polymeric matrices provide the advantages of high stiffness and strength to weight ratio and increased chemical inertness compared to conventional construction materials, i.e., wood, clay, concrete and steel. In spite of these advantages, the widespread use of synthetic FRP composites has been limited, among several factors, due to their higher initial material costs, their use in non-efficient structural forms and their environmental impact.

Increased environmental awareness and the interest in long-term sustainability of construction materials have thus challenged the development of environmentally friendly alternatives to synthetic oil-based FRP composites (Mohanty et al. *Macromol Mater Eng*, Vol. 276/277, 1-24 (2000)). Natural-fiber-reinforced polymer composites, or bio-composites, have emerged in the past decade as an environmentally friendly and cost-effective option to synthetic FRP composites. Despite the interest and environmental appeal of bio-composites, their use has been limited to non-primary, or non-load-bearing applications due to their lower strength and stiffness compared with synthetic FRP composites (Biswas et al., "Development of Natural Fiber Composites in India", Proceedings of the Composites Fabricators Association's Composites, Tampa, Fla. (2001)). Recent developments, however, have shown that the properties of "engineered" bio-composites (Mohanty et al., "Surface modifications of Natural Fibers and performance of the Resulting Bio-composites: An Overview," Composite Interfaces, 8, 313-343, (2001); and Mishra, S., et at, Composite Science and Technology 63, 1377-1385, (2003)) are a technical, economical, and environmentally conscious alternative to E-glass fiber reinforced composites (the most common synthetic fiber composite) without sacrificing performance. While bio-composite materials with specific properties equivalent to entry-level structural materials are feasible, this performance level is still not enough to make them able to compete with existing construction materials. However, the structural performance of a component depends on both its material and structural properties. The lower material stiffness of bio-composites can thus be overcome by using efficient structural configurations that place the material in specific locations for highest structural efficiency. Natural fibers embedded in a natural or synthetic polymeric matrix, known as bio-composites, have gained recent interest because of their low material and manufacturing costs, light weight, high specific modulus (elastic modulus over density), and environmentally friendly appeal (Mohanty et al., *Macromol Mater Eng*, Vol. 276/277, 1-24 (2000)). Natural fibers are categorized depending on their source as either leaf or bast fibers. Bast fibers have the highest mechanical properties and thus are ones typically considered for structural applications. The most common bast fibers are flax, hemp, jute, and kenaf. Typical mechanical properties of these fibers together with E-glass fibers are given in Table 1. All natural fibers are lingo-cellulosic in nature with the basic components being cellulose and lignin. The density of natural fibers is about half that of E-glass (Table 1), which makes their specific strength quite comparable, while the elastic modulus and specific modulus is comparable or even superior to E-glass fibers. Hybrid bio-composite cellular structures can be used in multi applications (e.g., building walls, floors and roofs, bridge and ship decks, aircraft floors) with tailored integrated multi-functions (i.e., stiffness, strength, thermal insulation, fire protection, and user friendliness). The sustainability and social acceptance of the proposed components, stemming from its large constituency on rapidly renewable resources, will pioneer the use of agricultural commodities in markets aimed at load-bearing materials and structures.

TABLE 1

Mechanical Properties for Selected
Natural Fibers and E-Glass Fiber

| Fiber Type | Density (g/cm3) | Elastic Modulus (GPa) | Tensile Strength (MPa) | Specific Modulus (GPa/g/cm3) | Specific Strength (MPa/g/cm3) |
| --- | --- | --- | --- | --- | --- |
| E-glass | 2.55 | 73 | 2000-3500 | 29 | 780-1370 |
| Hemp | 1.48 | 70 | 690 | 47 | 466 |
| Flax | 1.4 | 60-80 | 345-1100 | 43-57 | 250-785 |
| Jute | 1.46 | 10-30 | 400-750 | 7-21 | 275-510 |
| Sisal | 1.33 | 38 | 450-640 | 29 | 340-480 |

Pultrusion is a process for continuously forming reinforced plastic materials having a uniform cross-sectional profile. The word "pultrusion" is a hybrid which combines the words "pull" and "extrusion". The product is literally pulled through a forming die. In its most usual form, pultrusion involves feeding a multiplicity of fiberglass roving strands, with or without additional plies of glass mat of appropriate width, into a pultrusion die. A resin, normally a thermosetting material such as polyester, is injected into the die where it is uniformly distributed among the reinforcing materials. Alternatively, the reinforcing material may be drawn through a resin bath prior to entry into the die. The die itself is heated. As the product is drawn from the die, the resin is either cured, or very nearly cured. The endless product so formed is then cut to appropriate length. Many variations of this general process have been developed as the technology has matured. Pultruded products are used in a great variety of applications. In many places they have replaced metallic construction materials, particularly those used in highly corrosive environments. Structural beams, floor gratings, handrails, ladders, and many similar products are now made by a pultrusion process. A general background on pultrusion is found in an article by Martin, *Modern Plastics Encyclopedia*, pp. 40 317-318, McGraw-Hill, Inc., New York (1986).

U.S. Pat. No. 4,252,696 describes polyester resin compositions containing 4-10 parts of particular cellulose acetate butyrate resins per 100 parts of particular polyester resins which can pultruded at greater speeds to give products having diminished surface roughness and internal and/or external cracking. These compositions have been found to give bulk or sheet molding compositions capable of producing thick moldings that are crack-free.

U.S. Pat. No. 4,541,884 describes pulling a continuous tow or roving of fibers through a mixture of a thermoplastic polymer and a volatile plasticizer. The plasticizer reduces the melt viscosity to achieve uniform impregnation of the reinforcing fibers. After forming the product, the plasticizer is volatilized. However, the reinforcing must have sufficient longitudinal strength to enable it to be drawn through the viscous impregnation bath. In this invention, at least 50% by volume of the fibers must be aligned in the direction of draw.

U.S. Pat. No. 4,028,477 describe a method for producing a pultruded product by first taking an open cell foamed core material and impregnating it with a thermosetting resin. The impregnated foam core is faced on one or both sides with a resin free fibrous reinforcing layer. The assembly is then molded in a pultrusion die where the resin flows from the foam into the reinforcement. The foam core is ultimately totally collapsed in the process. Cellulosic paper, cotton fabric, asbestos, nylon, and glass are disclosed as reinforcing materials.

Cellulosic materials have found very little use in any capacity in reinforced plastic materials based on polyester resins. They have had a long standing reputation, not without some justification, for causing soft cures and tacky surfaces. This has been particularly true for products based on wood fiber which have not been chemically modified. U.S. Pat. No. 3,361,690, describes the use of Douglassfirbark fiber as a reinforcing material for polyester-based bulk molding compounds. U.S. Pat. No. 3,248,467 describes the use of Douglassfirbark fiber as a reinforcing material in melamine overlaid reinforced plastic moldings. However, the bark fiber products appear to be an exception to the problems encountered with other cellulose based materials.

Purified cellulose has found widespread use in thermosetting resins such as impregnated phenolic and melamine laminates and molding compounds. However, it has not been generally regarded as useful in pultruded products. A few applications using helical wound paper have appeared in the patent literature. Japanese patent application No. 56-17245 describes the use of a low density (ca. 0.7 g/cc or lower) paper tube which serves as a permanent mandrel for a pultruded cylindrical shape. The resin and glass composite surrounding the tube is bonded only to the surface and the tube itself is not impregnated with resin. It is apparent that the process is not simple in commercial scale and not cost effective.

French Patent Application No. 2,391,067 teaches the use of a plurality of reinforcing fiber bundles, each of which is wrapped with a barrier material of paper. These may then be used in pultruded or extruded products. The barrier material serves to prevent passage of resin into the reinforcing fiber bundles. It is important to impregnate the barrier layer.

U.S. Pat. No. 3,470,051 describes reinforced plastic rods either as hollow tubes or solid tubes which includes an outer layer of longitudinally extending, exactly parallel, reinforcing glass fibers roving, impregnated with a resin-emulsion. The outer layer may be formed on a core and the layer may be produced simultaneously. A relatively complex helically wound preformed and then used it as a core for pultruded products such as arrow shafts. The preform has a double layer of paper, then a layer of glass, and finally another layer of paper. This is then coated with resin and molded into a rod before use in the pultrusion process. But it has been found critical to make higher width, high thick profile product.

An early article describing the pultrusion process (*Machine Design*. 43, Dec. 26, 1971, pp. 45-49) speculates that any material that can be fed from a coil is a "possibility" for use in the pultrusion process. Paper products, along with a host of other materials, are suggested as being potentially useful.

U.S. Pat. No. 4,983,453 describe a composite pultruded product and the method for its manufacture.

The product is made with a plurality of longitudinal glass roving strands. In addition, a cellulosic mat is used in association with the roving. The mat serves as a filler, or reinforcing filler. In the method, cellulose-based material completely resin saturated and then co-pultruded with a reinforcing glass roving. It has been found critical to have desired strength with paper products. The process of making product by using only cellulose material and even in combination with glass rovings leads to non-uniformity in physical properties.

In none of these prior arts, synthetic non-woven fabrics encapsulated resin impregnated Jute mats have been used for making continuous high thickness profiles and plates.

Despite the enormous versatility of the pultrusion method and many variations which have been developed around it, it still has limitations. In many cases it is necessary to overdesign products in order to ensure uniform distribution of the glass reinforcement within the resin matrix. Products with low glass content tend to show areas of resin separation in which the reinforcing material may be completely absent. This resin separation is apt to occur even when high concentrations of mineral fillers are used with the resin. Pultruded products also tend to have relatively high density in comparison to many other plastic composites. This results in a relatively high cost per unit volume of the finished product. Further, because of the problem of resin separation at low reinforcing fiber contents, it is very difficult to make products less than about three millimeters in thickness, even though they may not be required to have high strengths. While some attempts have been made in the prior art to address these deficiencies, none have been particularly successful to the present time. Again product with high cellulosic fiber has limitation of pull strength and moisture content.

Accordingly, there is a long felt need to develop a simple yet technically improved and economically significant process of preparing bio-composites, which is fast and simple, and yields improved products having uniform mechanical property, light weight still enhanced tensile and bending strength and high endurance subject to dynamic application.

Objects of the Invention

An object of the invention is to provide a pultrusion system for continuous production of bio-composite pultruded products; wherein the system is totally enclosed thereby eliminating wastage of material due to spilling of raw material during the manufacture thus making it clean, cost effective and efficient.

Another object of the invention is to provide the pultrusion system for continuous production of bio-composite pultruded products; wherein preforming die is specially designed to be having a cavity about longitudinal axis with a shape of either "I" or "Plate" profile and tapering at end so as to overcome the limitation of feeding impregnated reinforcing fibres into intricate die.

Yet another object of the invention is to provide the pultrusion system for continuous production of bio-composite pultruded products; wherein the system has screw extruder as integral part as to overcome the limitation of feeding chopped natural fibres through resin bath by coextrusion technique in plurality to pultrusion.

Yet another object of the present invention is to provide the pultrusion system for continuous production of bio-composite pultruded products; wherein the system has roller stand instead of creel stand for feeding fibres or fabrics or mats that use less space as compared to conventional creel stand.

Still another object of the invention is to provide a continuous pultrusion method for production of bio-composite pultruded products; said process is reducing manufacturing cost, reducing environmental impact and improving bio-composite products, which can be used as efficient structural beam or plate or panel in a modular structure.

Yet still another object of the invention is to provide bio-composite pultruded products; said bio-composite products having uniform property and overcome limitation of conventional over-designed thin and thick glass reinforced composites products.

Additional object of the invention is to provide the bio-composite pultruded products; said products have improved low ratio of weight to strength.

Another additional object of the invention is to provide the bio-composite pultruded products; said products have improved, thicker and wider profiles and plates products.

Yet another additional object of the invention is to provide bio-composite pultruded products; said products have improved bio-based hybrid advanced composites, thereby having more fatigue life than the conventional natural fibre composites.

Still another additional object of the invention is to provide the bio-composite pultruded products; said products have more impact/tensile/bending strength than the conventional natural fibre composites.

Yet still another additional object of the invention is to provide bio-composite pultruded products; said products have majority of natural fibres thereby making bio-based composites.

Yet still another additional object of the invention is to provide bio-composite pultruded products; said products eliminate use of conventional glass roving and overcomes the limitation of jamming of glass roving in resin bath.

Yet still another additional object of the invention is to provide a jute waste needle punched mats manufactured from jute or synthetic fibres or both without any jute fabric; having a moisture content of 5% or less, a density not greater than about 0.45 g/cc, and weight in the range of about 600 to 4000 GSM; said mat is used for the production of bio-composite products of the invention.

BRIEF DESCRIPTION OF THE ACCOMPANYING DRAWINGS

FIG. 1 illustrates "Plate" profile of bio-composite products:
A. Bio-composite pultruded product of Plate profile having coextruded bagasse as core encapsulated with jute which is further encapsulated with glass fabrics;
B. Bio-composite pultruded product of Plate profile having jute as core encapsulated with glass fabrics; and
C. Bio-composite pultruded product of Plate profile having jute as core encapsulated with polyester fabrics.

FIG. 2 illustrates "I"—profile of bio-composite products:
A. Bio-composite pultruded product of "I" profile having coextruded bagasse as core encapsulated with jute which is further encapsulated with glass fabrics;
B. Bio-composite pultruded product of "I" profile having jute as core encapsulated with glass fabrics; and
C. "Bio-composite pultruded product of "I" profile having jute as core encapsulated with polyester fabrics.

DETAILED DESCRIPTION OF THE INVENTION

The present invention as described below, it is to be understood that this invention is not limited to particular embodiments, drawings, methodologies and materials described, as these may vary as per the person skilled in the art. It is also to be understood that the terminology used in the description is for the purpose of describing the particular embodiments only, and is not intended to limit the scope of the present invention.

Before the present invention is described, it is to be understood that unless defined otherwise, all technical and scientific terms used herein have the same meaning as commonly understood by one of ordinary skill in the art to which this invention belongs. Further, it is to be understood that the present invention is not limited to the methodologies and materials similar or equivalent to those described herein can be used in the practice or testing of the present invention, the preferred methods and materials are described, as these may vary within the specification indicated. Unless stated to the contrary, any use of the words such as "including," "containing," "comprising," "having" and the like, means "including without limitation" and shall not be construed to limit any general statement that it follows to the specific or similar items or matters immediately following it. Embodiments of the invention are not mutually exclusive, but may be implemented in various combinations. The described embodiments of the invention and the disclosed examples are given for the purpose of illustration rather than limitation of the invention as set forth the appended claims. Further the terms disclosed embodiments are merely exemplary methods of the invention, which may be embodied in various forms.

It is also to be understood that the terms "a", "an", "the" and like are words for the sake of convenience and are not to be construed as limiting terms. Moreover, it will be understood that the illustrations are for the purpose of describing a particular exemplary embodiment of the invention and are not limited to the invention thereto.

The term "fibres" or "fibre" or "fabric" or "fabrics" are interchangeable and intend to cover single as well as plural fibre or fabric.

Cellular and sandwich structures are structural configurations that yield high structural performance for minimum material use and thus have minimum weight (Gibson, et al., Cellular Solids: Structure and Properties, Pergamon Press, Oxford (1988)). This concept has been recognized for some time and has recently gained new attention due to the way that nature's own materials and structures follow these principles. Natural fibers embedded in a natural or synthetic polymeric matrix, known as bio-composites, have gained recent interest because of their low material and manufacturing costs, light weight, high specific modulus etc. Natural fibers are categorized depending on their source as either leaf or bast fibers. Bast fibers have the highest mechanical properties and thus are ones typically considered for structural applications. The most common bast fibers are flax, hemp, jute, and kenaf.

All natural fibers are lingo-cellulosic in nature with the basic components being cellulose and lignin. The density of natural fibers is about half that of E-glass which makes their specific strength quite comparable, while the elastic modulus and specific modulus is comparable or even superior to E-glass fibers. The applications for which bio-composites have been studied include interior paneling of automobiles and replacement of wood in housing applications such as plywood, roof surface paneling, partitioning and furniture. However, the uses in these markets have been limited to non-structural applications where weight and cost can be reduced. Consideration of bio-composites for load-bearing, or structural applications has been neglected due to their low stiffness and strength in comparison with conventional construction materials, and only limited research and development projects have considered potential structural uses.

Hybrid bio-composite cellular structures can be used in multi applications (e.g., building walls, floors and roofs, bridge and ship decks, aircraft floors) with tailored integrated multi-functions (i.e., stiffness, strength, thermal insulation, fire protection, and user friendliness). The sustainability and social acceptance of the proposed components stemming from its large constituency on rapidly renewable resources will pioneer the use of agricultural commodities in markets aimed at load-bearing materials and structures.

In the present invention, a natural fiber like jute, hemp, sisal and flex is used as reinforcing material encapsulated synthetic fibers like polyester, carbon, aramid, glass, basalt and mixtures thereof, creating a hybrid product in continuous process. The appropriate form of a natural fiber is mats, supplied as in rolls form and led through dryers to performer. The use of synthetic fabrics and/or cloths, reduce co-efficient of friction in die during and enhance longitudinal strength in processing. Thus reduce the density and cost of the product. It also enables more ease in production, enhances productivity and uniformity in product properties.

In many cases, thick panels in the range of about 9-10 mm thick, must be substantially over-designed in glass fiber compound because it is not practical to pultrude through large die gap. As fiber glass roving supply is maintained in a conventional creel, a sufficient number of roving strands are drawn from the creels into a performer. However, if the glass fiber content is increased, then it increases coefficient and cause jamming in the die. Further, increased cross-section will required higher numbers of bobbins which itself difficult to handle. Large space required to accommodate higher numbers of creel stands. Low density natural fibers based bio-composites can maintain composition integrity and provide higher stiffness with low cross-sectional area which itself is limitation for glass roving reinforced composites. Hybridization cellulosic mats and fibers may not have integrity and uniform properties like bending moments.

Figure 1A:
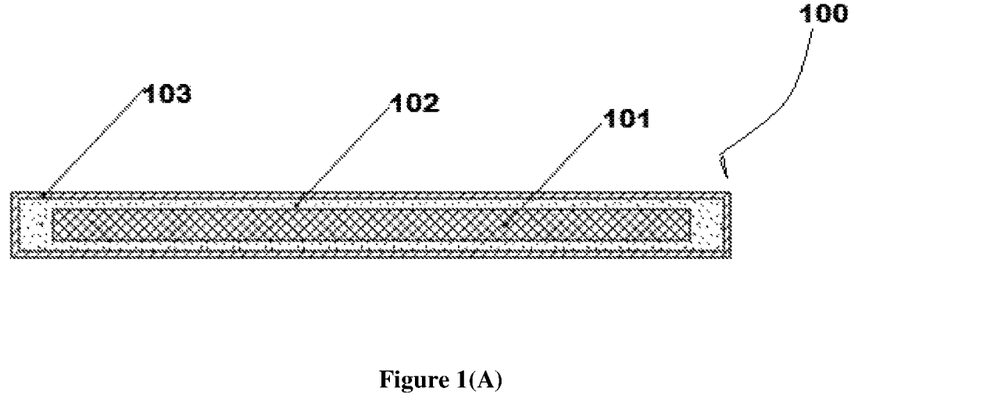
Figure 1B:
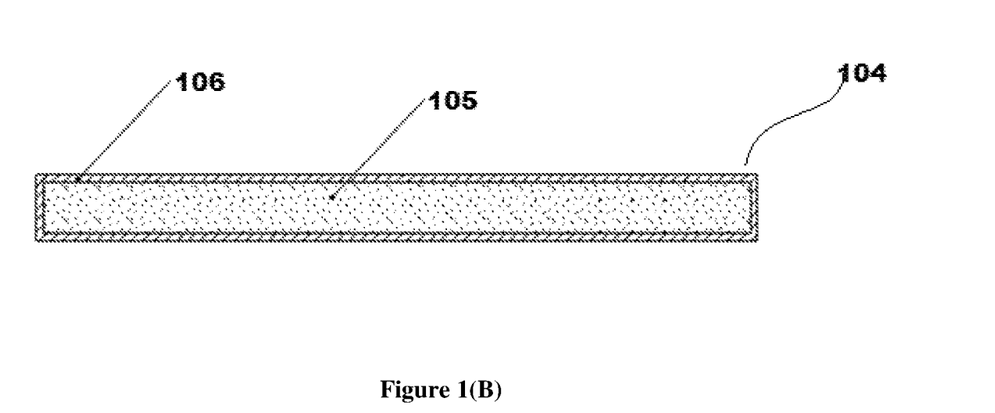
Figure 1C:
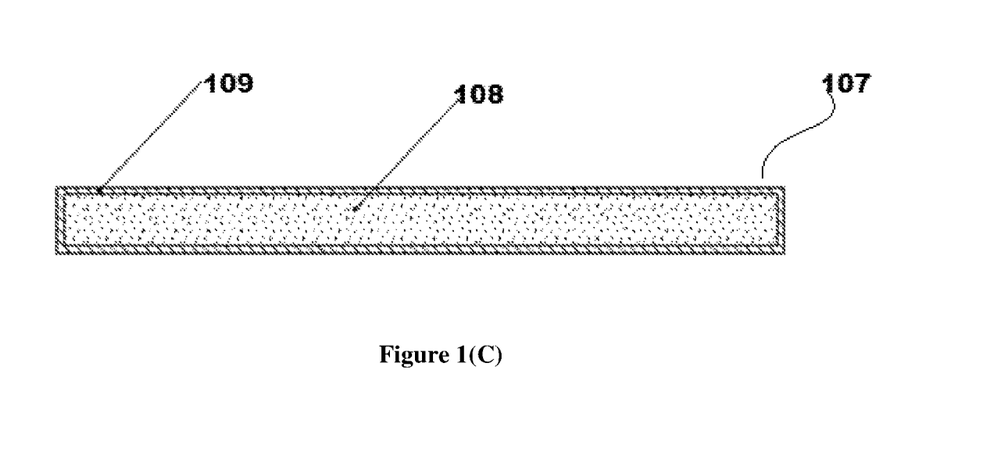
Figure 2A:
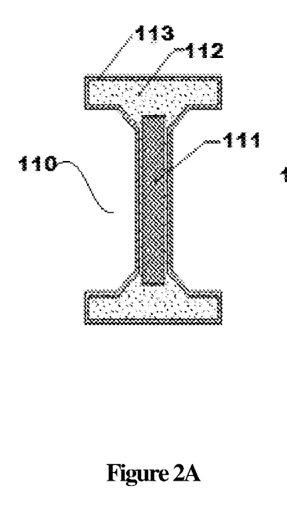
Figure 2B:
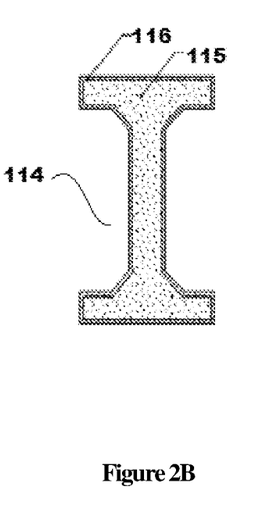
Figure 2C:
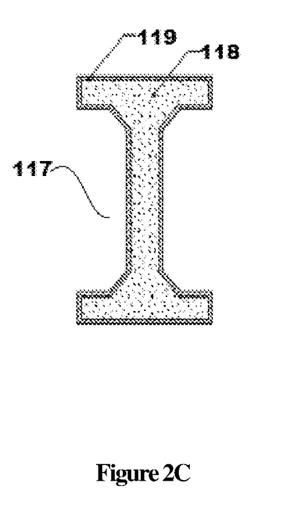

According to one of the embodiments of the invention, there is provided bio-composite pultruded product consisting essentially natural fibres selected from hemp, jute, sisal and flex as core impregnated with a resin system, enclosed between bi-directionally and/or uni-directionally oriented synthetic fabric selected from polyester, carbon, aramid, glass, basalt and mixtures thereof impregnated with a resin system; said bio-composite product is either of "Plate" profile [FIG. 1(B) or (C)] or "I" profile [FIG. 2 (B) or (C)]. Preferably, the product comprises 10% to 50% by vol. of natural fibre, 10% to 30% by vol. of synthetic fabric and 40% to 60% by vol. of resin system.

According to another embodiment of the invention, there is provided another bio-composite pultruded product consisting essentially plank of short fibers bagasse premixed with a resin system as core encapsulated between the natural fibers selected from hemp, jute, sisal and flex impregnated with the resin system which is further encapsulated between bi-directionally and/or uni-directionally oriented synthetic fabric selected from polyester, carbon, aramid, glass, basalt and mixtures thereof impregnated with the resin system;

said bio-composite product is either of "Plate" profile [FIG. 1(A)] or "I" profile[FIG. 2 (A)].

Preferably, the product comprises 10% to 40% by vol. of natural fibre, 5% to 10% by vol. of synthetic fabric, 10% to 30% by vol. of bagasse short fibres and 40% to 60% by vol. of resin system.

Preferably, said synthetic fabric having a moisture content of 5% or less, weight of 100 to 600 gm/m$^2$, and tensile strength of 400 to 500 MPa.

Preferably, the synthetic fabric is preferably glass fabric.

Typically, the bagasse fibres are premixed with the resin system prior to extrusion in equal proportion.

The resin system used for impregnation of natural fibers or synthetic fabric, comprise of at least a resin, curing system comprising curing agent and accelerator, filler, thinner, pigment or any other additives.

Particularly, the resin used in the resin system is either a thermosetting resin selected from unsaturated polyester, epoxy, polyurethane, phenolic resins and mixture thereof or a thermoplastic resin selected from polyethylene, polypropylene, acrylonitrile-butadiene-styrene, polyacetal, polyamide, polyimide, saturated polyester resins and mixtures thereof.

Particularly, the curing agent used in the resin system is selected from methyl ethyl ketone peroxide, cumene hydroperoxide, t-butyl hydroperoxide, benzoyl peroxide, and/or hydrogen peroxide.

Particularly, the accelerators used in the resin system is selected from cobalt naphthenate and/or cobalt octoate.

Particularly, the filler used in the resin system is calcium carbonate.

Particularly, thinner is methanol.

Typically two types of resin system are used in the present invention.

First type of the resin system comprises at least 100 parts per hundred (pph) of resin and at least 20 pph of thinner. Particularly, the resin system comprises 100 pph of phenol formaldehyde resin and 20 pph of methanol.

Second type of the resin system comprises at least 100 pph of resin, at least 1.7 pph of curing system, at least 2 pph of filler, and at least 10 pph of thinner. Particularly, the resin system comprises 100 pph of polyester, 1.7 pph of curing system comprising 0.2 pph of cobalt octoate and 1.5 pph of benzoyl peroxide, 2 pph of calcium carbonate and 10 pph of Methanol. Natural fibers used in both bio-composite products are selected from hemp, flax, jute and sisal in the form of fibers, mat, roving and/or a mixture thereof. The present invention uses punched jute mats made from jute waste. However, use of other natural fibers punched mat instead of jute mat or other forms of natural fibers including jute should be considered within the scope of the invention. Thus, mat used in the product may content flax, hemp, jute and sisal fibers. Natural or synthetic fibers or fabrics including mats or any other forms used in the invention do not require any processing before impregnation step. However, they need to pass through IR heater for the dehumidification so as to enhance resin affinity.

Preferably, the natural fiber used is dried jute waste needle punched mats of 2000-4000 GSM. According to the present invention, jute waste needle punched mats used in the invention comprises multiple layer of jute fabric enclosed in jute waste fibers and needle punched; said mat having a moisture content of 5% or less, a density not greater than about 0.45 g/cc, tensile strength of 300 to 500 MPa and weight of 600 to 4000 GSM.

According to the present invention, jute waste needle punched mats used in the invention is produced by placing multiple layer of jute fabric enclosed in jute waste fibres and followed by needle punching to get mat;

said mat having a moisture content of 5% or less, a density not greater than about 0.45 g/cc, tensile strength of 300 to 500 MPa and weight of 600 to 4000 GSM.

Conventionally, jute waste needle punched mats comprises multiple layer of waste jute fabric and needle punched; said mat having a moisture content of 6 to 8%, a density not greater than about 0.45 g/cc, weight in the range of about 300 to 1000 GSM, tensile strength of 150 to 200 MPa.

Conventionally, jute waste needle punched mats are produced by placing multiple layer of jute waste fibres followed by needle punching to get mat;

said mat having a moisture content of 6 to 8%, a density not greater than about 0.45 g/cc, weight in the range of about 300 to 1000 GSM, tensile strength of 150 to 200 MPa.

The core of the products may include coextruded bagasse plank or bagasse mixed with resin system and further coextruded into plank or natural fibers including mat impregnated with the resin system. However, use of combination of bagasse along with natural fibers including mat with or without the resin system should be considered within the scope of the invention.

DETAILED DESCRIPTION OF THE ACCOMPANYING DRAWINGS

FIG. 1(A) illustrates sectional view of Plate profile bio-composite product (100), where coextruded bagasse plank (101) as core encapsulated with jute fibers (102), which is further encapsulated with glass fabrics (103).

FIG. 1(B) illustrates sectional view of Plate profile bio-composite product (104), where jute fibers (105) as core which is encapsulated with glass fabrics (106).

FIG. 1(C) illustrates sectional view Plate profile bio-composite product (107), where jute fibers (108) as core which is encapsulated with polyester fabrics (109).

FIG. 2(A) illustrates sectional view of "I" profile bio-composite product (110), where coextruded bagasse plank (111) as core encapsulated with glass fabrics (112)), which is further encapsulated with glass fabrics (113).

FIG. 2(B) illustrates sectional view of "I" profile bio-composite product (114), where jute fibers (115) as core which is encapsulated with glass fabrics (116).

FIG. 2(C) illustrates sectional view of "I" profile bio-composite product (117), where jute fibers (118) as core which is encapsulated with polyester fabrics (119).

According to yet another embodiment of the invention, there is provided a pultrusion system for continuous production of bio-composite pultruded products of the invention. The pultrusion system for continuous production of bio-composite pultruded products of the invention is illustrated in FIG. 3.

Figure 3:
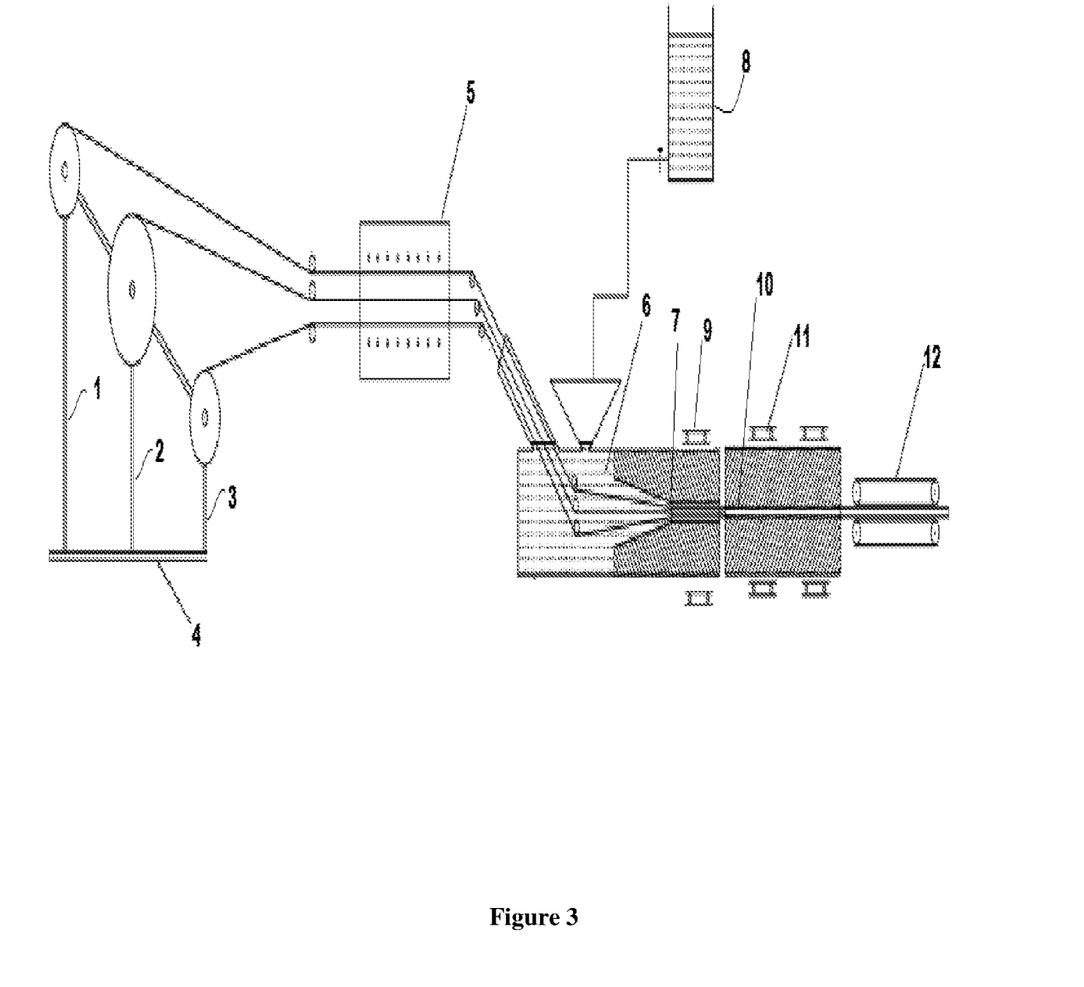
FIG. 3 illustrates a pultrusion apparatus for continuous production of a bio-composite pultruded product; particularly "Plate" or "I" profile as shown in FIGS. 1 (B) and (C) and FIGS. 2 (B) and (C).

In the FIG. 3, the roller stands are used in place of conventionally used creel stand. The roller stand occupies less space as compared to creel stand.

The pultrusion system for continuous production of bio-composite pultruded products of the invention comprises:

a roller stand (4) provided with at least three roller means (1, 2, 3) to feed at least one natural fibre and at least two synthetic fibres;

a heating means (5), preferably IR heater, said IR heater is in close proximity to roller means (1, 2, 3) of roller stands (4) so as to pass natural and synthetic fibres through it to reduce moisture from thereof;

an enclosed resin bath (6) provided with a resin storage and charging unit (8) and preforming die (7) enclosed in it; said resin storage and charging unit adapted to provide resin system for impregnation of the fibres to said resin bath (6), and said preforming die (7) having die cavity about longitudinal axis and tapering at end so as to squeeze fibres impregnated with resin; said resin bath is in close proximity to said IR heater (5) so as to pass natural and synthetic fibres through said resin bath followed by said preforming die cavity (7);

heating means (9), preferably heating plates provided to said preforming die (7) to encapsulate along its length; said die (7) being activable to heat to transfer a precured preform of squeezed resin impregnated fibres to further location;

a pultrusion die (10) provided in close proximity to said preforming die (7) so as to pass said precured preform of squeezed resin impregnated fibres through it;

heating means (11), preferably heating plates provided to said pultrusion die (10) to encapsulate along its length; said die (10) being activable to heat to transfer a cured pultruded bio-composite product to further location; and an external pultrusion puller (12) provided at the end of the system to pull said cured pultruded bio-composite product from said pultrusion die (10);

said cured pultruded bio-composite product consisting essentially natural fibre impregnated with said resin system as core encapsulated between bi-directionally and/or uni-directionally oriented synthetic fabric impregnated with said resin system;

said bio-composite product is either in "I" profile [FIG. 1 (B) or (C)] or "Plate" profile[FIG. 2 (B) or (C)].

The step of reducing moisture by passing natural or synthetic fibres or fabric or mat through IR heater enhances affinity of the mats, fibres or fabrics towards the resin system. The ability of the mats, fibres or fabrics to readily absorb resin is essential for production of the bio-composite products.

Typically, natural fibre or synthetic fabric is passed through IR heater (5) by maintaining speed of 2 to 6 meter per hour of fibres/fabric/mat in it. After passing through IR heater, the natural fibre or synthetic fabric has 3 to 4% moisture.

Typically, the precured preform obtained from preforming die (7) is squeezed mats, fibres or fabrics which are at least 40% impregnated with the resin system.

Typically, the preforming die (7) having cavity designed to be adapted "I" profile or "Plate" profile.

Typically, "I" profile die having cavity adapted to have dimension of 20 mm thick of I beam of flange with width 70 mm and height of 120 mm.

Typically, "Plate" profile die having cavity adapted to have dimension of 8-16 mm thick and 600-1200 mm width.

Typically, the preforming die (7) is maintained at temperature in the range of 70 to 90° C. by using heating mean (9).

Typically, the pultrusion die (10) having cylindrical cavity die adapted to process precured "I" profile or "Plate" profile preform through it.

Typically, the pultrusion die (10) is maintained at temperature in the range of 160 to 180° C. by using heating mean (11).

Typically, the fibres, fabrics or mat is passed at speed of 2 to 6 meter per hour through enclosed resin bath (6) for the impregnation of fibres, fabrics or mats.

Typically, the resin impregnated fibres, fabrics or mat is passed at speed of 2 to 6 meter per hour through the preforming die (7) to obtain precured "I" profile or "Plate" profile preform. Typically the precured "I" profile or "Plate" profile preform is passed at speed of 2 to 6 meter per hour through the pultrusion die (10) to obtain cured "I" profile or "Plate" profile preform.

According to still another embodiment of the invention, there is provided a continuous pultrusion method for production of the bio-compo site pultruded products of the invention by using the system of the invention as illustrated in FIG. 3.

In this method, 10 to 50% by vol. of natural fibres selected from hemp, jute, sisal and flex are provided by roller mean (2) and 10 to 30% by vol. of synthetic fabric selected from polyester, carbon, aramid, glass, basalt and mixtures thereof are provided by roller means (1 and 3). These fibres/fabrics are passed through IR heater (5) at speed of 2 to 6 meter per hour to reduce moisture from thereof. These fibres are impregnated by passing them at speed of 2 to 6 meter per hour through the resin bath (6) comprising a resin system followed by passing them at speed of 2 to 6 meter per hour through a preforming die (7) under heating at temperature in the range of 70 to 90° C. by using heating means (9) to obtain a precured preform of squeezed fibres impregnated with the said resin system. The precured preform of squeezed fibres impregnated with the resin system is transferred from the said die (7) to pultrusion die (10); die (7) is activable to heat to transfer said precured preform to pultrusion die (10). The said precured preform is passed at speed of 2 to 6 meter per hour through pultrusion die (10) under heating at temperature in the range of 160 to 180° C. using heating means (11) to obtain a cured pultruded hybrid bio-composite product. The said die (10) being activable to heat to transfer and further expel the said cured pultruded bio-composite product. The said cured pultruded bio-composite product is pulled by external pultrusion puller (12).

Typically, the precured preform of squeezed fibres impregnated with the resin system obtained from preforming die (7) is either "I" profile or "Plate" profile.

The above described system and corresponding continuous pultrusion method is used to produce the said pultruded bio-composite product consisting essentially natural fibre impregnated with the resin system as core encapsulated between bi-directionally and uni-directionally oriented synthetic fabric impregnated with the resin system;

said bio-composite products are either "I" profile [see FIG. 1 (B) or (C)] or "Plate" profile [see FIG. 2 (B) or (C)].

Preferably, the product comprises 10 to 50% by vol. of natural fibre, 10 to 30% by vol. of synthetic fabric and 40 to 60% by vol. of resin system.

Preferably, the natural fiber used is dried jute waste needle punched mats of 2000-4000 GSM.

Preferably, said jute waste needle punched mats comprises multiple layer of jute fabric enclosed in jute waste fibres and needle punched; said mat having a moisture content of 5% or less, a density not greater than about 0.45 g/cc, tensile strength of 300 to 500 MPa and weight of 600 to 4000 GSM.

Typically, said jute waste needle punched mats used in the invention is produced by placing multiple layer of jute fabric enclosed in jute waste fibres and followed by needle punching to get mat;

said mat having a moisture content of 5% or less, a density not greater than about 0.45 g/cc, tensile strength of 300 to 500 MPa and weight of 600 to 4000 GSM.

Typically, said mat having a moisture content of 3 to 4% or less, a density not greater than about 0.45 g/cc, tensile strength of 300 to 500 MPa and weight of 600 to 4000 GSM. Preferably, said synthetic fabric having a moisture content of 5% or less, weight of 100 to 600 gm/m2 and tensile strength of 400 to 500 MPa.

Preferably, the synthetic fabric is glass fabric.

The resin system used for impregnation of natural fibers or synthetic fabric, comprise of at least a resin, curing system comprising curing agent and accelerator, filler, thinner, pigment or any other additives.

Particularly, the resin used in the resin system is either a thermosetting resin selected from unsaturated polyester, epoxy, polyurethane, phenolic resins and mixture thereof or a thermoplastic resin selected from polyethylene, polypropylene, acrylonitrile-butadiene-styrene, polyacetal, polyamide, polyimide, saturated polyester resins and mixtures thereof.

Particularly, the curing agent used in the resin system is selected from methyl ethyl ketone peroxide, cumene hydroperoxide, t-butyl hydroperoxide, benzoyl peroxide, and/or hydrogen peroxide.

Particularly, the accelerators used in the resin system is selected from cobalt naphthenate and/or cobalt octoate.

Particularly, the filler used in the resin system is calcium carbonate.

Particularly, the thinner is methanol.

Typically, two types of resin system used in the present invention.

First type of the resin system comprises at least 100 parts per hundred (pph) of resin and at least 20 pph of thinner. Particularly, the resin system comprises 100 pph of phenol formaldehyde resin and 20 pph of methanol (as thinner).

Second type of the resin system comprises at least 100 pph of resin, at least 1.7 pph of curing system, at least 2 pph of filler, and at least 10 pph of thinner. Particularly, the resin system comprises 100 pph of polyester, 1.7 pph of curing system comprising 0.2 pph of cobalt octoate and 1.5 pph of benzoyl peroxide, 2 pph of calcium carbonate (filler) and 10 pph of Methanol (thinner).

According to additional embodiment of the invention, there is also provided another pultrusion system for continuous production of another bio-composite pultruded product of the invention. The pultrusion system for continuous production of another bio-composite pultruded product of the invention is illustrated in FIG. 4.

Figure 4:
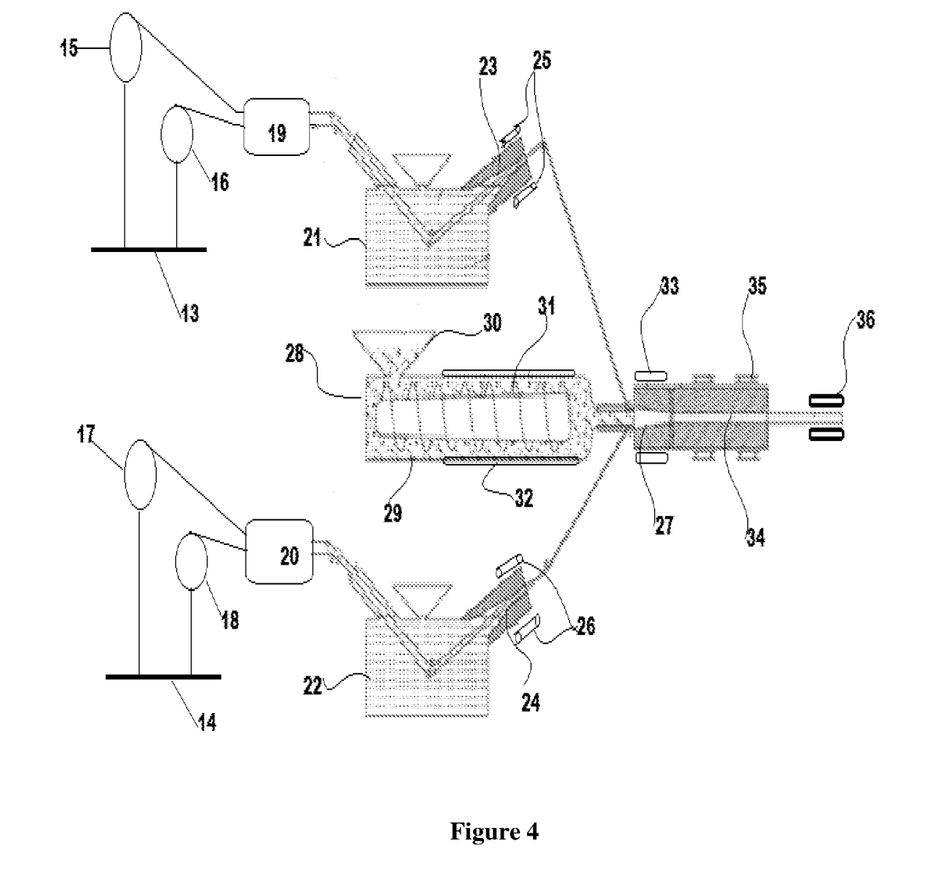
FIG. 4 illustrates a pultrusion apparatus for continuous production of a bio-composite pultruded product; particularly "Plate" or "I" profile as shown in FIG. 1 (A) and FIG. 2 (A).

In the FIG. 4, the system comprising:

at least two roller stands (13 and 14), each roller stands provided with at least two roller means (15,16) and (17, 18) to feed natural fibres and synthetic fabric;

heating means (19, 20), preferably IR heater; said IR heater (19, 20) is in close proximity to said each roller means (15,16) and (17, 18) so as to pass fibres through the heater to reduce moisture from thereof;

enclosed resin baths (21, 22) containing resin system for impregnation of the fibres in close proximity to said each IR heater (19, 20); said each resin bath (21, 22) provided with preforming die "A" (23, 24) enclosed in it respectively; and said preforming die "A" (23, 24) having die cavity about longitudinal axis which is tapering at end so as to squeeze fibres impregnated with the resin system; pressurising means (25, 26) provided to said preforming die "A" (23, 24) to encapsulate said die "A" (23, 24) along its length; said die "A" (23, 24) being activable to pressure to transfer said squeezed resin impregnated fibres to further location;

a screw extruder (28) comprising a barrel (29) connected to hopper (30) at one end, screw (31) along its longitudinal axis and pressure means (32) along its longitudinal axis; said hopper provides means for supplying short fibres of bagasse to produce a bagasse plank;

a preforming die "B" (27) in close proximity to said screw extruder (28) as well as said preforming dies "A" (23, 24) to enable to pass a bagasse plank from said extruder (28) and squeezed resin impregnated fibres from said die "A" (23, 24) for further processing to form a precured preform; said preforming die "B" (27) having long cylindrical cavity about longitudinal axis with tapering end;

heating means (33) provided to encapsulate said preforming die "B" (27) along its length; said die "B" (27) being activable to heat to transfer said precured preform to further location; a pultrusion die (34) in close proximity to said preforming die "B" (27); said pultrusion die (34) having slit die with uniform dimension along its length to further process the precured preform;

heating means (35) provided to encapsulate said pultrusion die (34) along its length; said pultrusion die (34) being activable to heat to cure preform and transfer to expel cured pultruded bio-composite products to further location; and external pultrusion puller (36) for pulling out said cured bio-composite pultruded product; said pultruded bio-composite product consisting plank of short fibers bagasse premixed with resin system as core encapsulated between the natural fibers selected from hemp, jute, sisal and flex impregnated with the resin system which is further encapsulated between bi-directionally and uni-directionally oriented synthetic fabric selected from polyester, carbon, aramid, glass, basalt and mixtures thereof impregnated with the resin system;

said bio-composite product is either "I" profile [FIG. 1 (A)] or "Plate" profile [FIG. 2 (A)].

The step of reducing moisture enhances affinity of the mats, fibers or fabrics towards the resin system. The ability of the mats, fibers or fabrics to readily absorb resin is essential for production of the bio-composite products. The resin system used in the invention consists of a resin, a curing system comprising curing agent and an accelerator, a pigment, filler, thinner or any other additives for impregnation of the fibers. The said hopper provides means for supplying short fibers of bagasse. The said preforming die "B" (27) having a cavity about longitudinal axis and tapering at end and said pultrusion die (34) having slit die with uniform dimension along its length. Thus, the precured preform obtained is squeezed mats, fibers or fabrics which are at least 40% impregnated with the resin system.

Typically, the natural fibre or synthetic fabric is passed through IR heaters (19, 20) by maintaining speed of 2 to 6 meter per hour of fibres/fabric/mat in it. After passing through IR heater, the natural fibre or synthetic fabric has 3 to 4% moisture.

Typically, the preforming die "A" (23, 24) having cavity about longitudinal axis which is tapering at end so as to remove excess resin system and obtain the said resin system impregnated squeezed fibres.

Typically, the preforming die "A" (23, 24) is activable under pressure using pressurizing means (25,26) to transfer squeezed resin impregnated fibres to said preforming die "B" (27).

Typically, preforming die "B" (27) having cavity designed to be adapted for "I" profile or "Plate" profile.

Typically, "I" profile die having cavity adapted to have dimension of 20 mm thick "I" beam of flange with width 70 mm and height of 100 to 120 mm.

Typically, "Plate" profile die having cavity adapted to have dimension of 8 to 16 mm thick, 600 to 1200 mm of width.

Typically, the preforming die "B" (27) is maintained at temperature in the range of 70 to 90° C. by using heating means (35).

Typically, the pultrusion die (34) having cylindrical cavity die adapted to process "I" profile or "Plate" profile precured preform through it.

Typically, the pultrusion die (34) is maintained at temperature in the range of 160 to 180° C. by using heating means (36).

Typically, the fibres, fabrics or mat is passed at speed 2 to 6 meter per hour through enclosed resin baths (21, 22) to obtain impregnated fibres with the resin system.

Typically, the squeezed impregnated fibres, fabrics or mat is passed at speed 2 to 6 meter per hour through the preforming die "A" (23, 24) to obtain squeezed fibres impregnated with the resin system.

Typically, the squeezed impregnated fibres, fabrics or mat and bagasse plank are passed at speed 2 to 6 meter per hour through the preforming die "B" (27) to obtain said precured preform.

Typically, the said precured preform passed at speed 2 to 6 meter per hour through the pultrusion die (34) to obtain cured hybrid pultruded bio-composite product.

According to another additional embodiment of the invention, there is provided another continuous pultrusion method for production of another bio-composite pultruded product of the invention by using system of the invention as illustrated in FIG. 4.

In this method, 10 to 40% by vol. of natural fibres selected from hemp, jute, sisal and flex is provided from roller mean (16 and 17) and 5 to 10% by vol. of synthetic fabric selected from polyester, carbon, aramid, glass, basalt and mixtures thereof is provided from roller mean (15 and 18). These fibres are passed through IR heater (19, 20) at speed of 2 to 6 meter per hour to reduce moisture from thereof. After reducing the moisture, the said fibres/fabrics are impregnated by passing them at speed of 2 to 6 meter per hour through resin bath (21, 22) comprising resin system consisting of at least a resin, a curing agent, an accelerator, pigment or any other additives. These impregnated fibres with the resin system are passed at speed of 2 to 6 meter per hour through preforming die "A" (23, 24) under pressure using pressurising means (25,26) to obtain squeezed fibres impregnated with the resin system. The squeezed fibres impregnated with resin system are transferred to preforming die "B" (27).

A plank from short fibres of bagasse is prepared by extruding short fibres of bagasse premixed with a resin system using the screw extruder (28) comprises supplying 10 to 30% by vol. of short fibres of bagasse premixed with a resin system in equal proportion through a hopper (30) to a barrel (29) having a screw (31) along its longitudinal axis and extruding it a at rotational speed of 20-30 RPM with 10 L/D ratio into plank. The extruded bagasse plank is transferred from the screw extruder (28) to a preforming die "B" (27). The extruded bagasse plank and two squeezed fibres impregnated with resin system are passed at speed of 2 to 6 meter per hour through the said preforming die "B" (27) under heating at temperature in the range of 70 to 90° C. using heating means (33), said two squeezed fibres are positioned above and below the extruded bagasse plank so as to encapsulate the bagasse plank between the natural fibres selected from hemp, jute, sisal and flex impregnated with the resin system which is further encapsulated by bi-directionally and/or uni-directionally oriented synthetic fabric selected from polyester, carbon, aramid, glass, basalt and mixtures thereof impregnated with the resin system and obtain precured preform of encapsulated bio-composite product.

The precured preform of encapsulated bio-composite product is finally passed at speed of 2 to 6 meter per hour through pultrusion die (34) under heating at temperature in the range of 160 to 180° C. using heating means (35) so as to obtain cured bio-composite pultruded product and expel it as it is activable under heating.

The cured pultruded bio-composite product is pulled out by external pultrusion puller (36).

The said cured pultruded bio-composite product obtained by using the above-mentioned system and the above-mentioned method consisting plank of short fibers bagasse premixed with a resin system as core encapsulated between the natural fibers selected from hemp, jute, sisal and flex impregnated with the resin system which is further encapsulated between bi-directionally and/or uni-directionally oriented synthetic fabric selected from polyester, carbon, aramid, glass, basalt and mixtures thereof impregnated with the resin system. The said bio-composite product is either "I" profile [FIG. 1 (A)] or "Plate" profile [FIG. 2 (A)].

Preferably, the product comprises 10 to 40% by vol. of natural fibre, 5 to 10% by vol. of synthetic fabric, 10 to 30% by vol. of bagasse short fibres and 40 to 60% by vol. of resin system.

Preferably, the natural fiber used is dried jute waste needle punched mats of 2000-4000 GSM. Preferably, said jute waste needle punched mats comprises multiple layer of jute fabric enclosed in jute waste fibres and needle punched; said mat having a moisture content of 5% or less, a density not greater than about 0.45 g/cc, tensile strength of 300 to 500 MPa and weight of 600 to 4000 GSM.

Typically, said jute waste needle punched mats used in the invention is produced by placing multiple layer of jute fabric enclosed in jute waste fibres followed by needle punching to get mat;
said mat having a moisture content of 5% or less, a density not greater than about 0.45 g/cc, tensile strength of 300 to 500 MPa and weight of 600 to 4000 GSM.

Typically, said mat having a moisture content of 3 to 4% or less, a density not greater than about 0.45 g/cc, tensile strength of 300 to 500 MPa and weight of 600 to 4000 GSM.

Preferably, said synthetic fabric having a moisture content of 5% or less, weight of 100 to 600 gm/m2, and tensile strength of 400 to 500 MPa.

Preferably, the synthetic fabric is preferably glass fabric.

The resin system used for impregnation of natural fibers or synthetic fabric, comprise of at least a resin, curing system comprising curing agent and accelerator, filler, thinner, pigment or any other additives.

Particularly, the resin used in the resin system is either a thermosetting resin selected from unsaturated polyester, epoxy, polyurethane, phenolic resins and mixture thereof or a thermoplastic resin selected from polyethylene, polypropylene, acrylonitrile-butadiene-styrene, polyacetal, polyamide, polyimide, saturated polyester resins and mixtures thereof.

Particularly, the curing agent used in the resin system is selected from methyl ethyl ketone peroxide, cumene hydroperoxide, t-butyl hydroperoxide, benzoyl peroxide, and/or hydrogen peroxide.

Particularly, the accelerators used in the resin system is selected from cobalt naphthenate and/or cobalt octoate.

Particularly, the filler used in the resin system is calcium carbonate.

Particularly, the thinner is methanol.

Two types of resin system used in the present invention.

First type of the resin system comprises at least 100 parts per hundred (pph) of resin and at least 20 pph of thinner. Particularly, the resin system comprises 100 pph of phenol formaldehyde resin and 20 pph of methanol (thinner).

Second type of the resin system comprises at least 100 pph of resin, at least 1.7 pph of curing system, at least 2 pph of filler, and at least 10 pph of thinner. Particularly, the resin system comprises 100 pph of polyester, 1.7 pph of curing system comprising 0.2 pph of cobalt octoate and 1.5 pph of benzoyl peroxide, 2 pph of calcium carbonate (filler) and 10 pph of Methanol (thinner).

Typically, the bagasse fibres are premixed with the resin system prior to extrusion in equal proportion.

Typically, bale form bagasse is crushed to form smaller particle size bagasse, followed by moisture reduction by passing through IR heater to reduce the moisture to 3 to 4% and then premixed with said resin system in equal proportion to be used in the present invention.

The post forming die may be heated and may be incorporated in the puller mechanism or may be separate. Alternatively one or more of the fibers or fabrics or rovings or mats supplied to the pultrusion die may be pre-impregnated with resin in bath. Bath may be located either before or after former.

It should be considered within the scope of the invention to carry the natural fiber mat and bagasse into the pultrusion dies encapsulated by glass or other type mat. The scope includes customized Jute felt of 2000-4000 GSM of 600 to 1500 mm width and resin premixed bagasse of 500-800 GSM plank of made by co-extrusion method.

Thus, pultrusion systems for continuous production of bio-composite pultruded products of the invention eliminating wastage of material due to spilling of raw material during the manufacture and making it clean, cost effective and efficient. The preforming die of the system is specially designed to be having a cavity about longitudinal axis with a shape of either "I" or "Plate" profile and tapering at end so as to overcome the limitation of feeding impregnated reinforcing fibres into intricate die. The present system has screw extruder as integral part as to overcome the limitation of feeding chopped natural fibres through resin bath by co-extrusion technique in plurality to pultrusion. The present system have roller stand instead of creel stand for feeding fibres or fabrics or mats which uses less space as compared to conventional creel stand. Thus, the current method is reducing manufacturing cost, reducing environmental impact and improving bio-composite products, which can be used as efficient structural beam or plate or panel in a modular structure. The bio-composite products of the invention have uniform property and overcome limitation of conventional over-designed thin and thick glass reinforced composites products. Also said products are with improved low ratio of weight to strength as well as said products are with improved, thicker and wider profiles and plates products. The said products with improved bio-based hybrid advanced composites, thereby having more fatigue life than the conventional natural fibre composites. The products of the invention have more impact/tensile/bending strength than the conventional natural fibre composites. Thus, the products have majority of natural fibres and thereby making bio-based composites. Thus, said products eliminate use of conventional glass roving and overcomes the limitation of jamming of glass roving in resin bath. The present invention increases uniformity of the property and the strength of natural fibre based more typically Jute and/or bagasse pultruded products by encapsulating the peripheral areas by synthetic fabrics more accurately glass fabrics and polyester fabrics or in combination thereof.

BEST MODE OR EXAMPLES FOR WORKING OF THE INVENTION

The present invention is described in the examples given below; further these are provided only to illustrate the invention and therefore should not be construed to limit the scope of the invention.

Example 1

"A" Bio-Composite Product "Plate" Profile

"Plate" profile flat pultruded product having a cross section 8×1000 mm was manufactured with 20% unidirectional glass fabric, 24% jute mat, and 56% resin system, all measured by volume.

Jute mat having weight of 2500 g/m$^2$, a density of about 85 kg/m3 and a thickness of 20 mm was used here (manufactured at Dindayal Gupta Pvt ltd, Kolkata).

24% by vol. of jute mats of 2500 GSM was provided by roller mean (2) and 20% by vol. of unidirectional glass fabric of 200 g/m$^2$ was provided by roller means (1 and 3). These fibers were passed through IR heater (5) at speed 4 meter per hour to reduce moisture to 3 to 4%. These fibers were impregnated by passing them at speed 4 meter per hour through the resin bath (6) comprising a resin system consisting of 100 part phenol formaldehyde (68 to 72% resole type phenol formaldehyde in water supplied by Shivam polymer Pvt. Ltd.) and 20 parts methanol. Both impregnated fabric and mat were passed through a preforming die (7) having cavity of plate profile of dimension i.e. 8 mm thick and 1000 mm width at speed 4 meter per hour and at temperature 80° C. to obtain a precured "Plate" profile resin squeezed preform. This precured preform was further passed through the pultrusion die (10) at speed 4 meter per hour and at temperature 170° C. using heating means (11) to obtain a cured pultruded bio-composite product of "Plate" profile. "Plate" profile pultruded bio-composite product from the said pultrusion die (10) was pulled out with the help of an external pultrusion puller (12).

Example 2

"B" Bio-Composite Product "Plate" Profile

"Plate" profile flat pultruded product having a cross section 8×1000 mm was manufactured with 15% unidirectional glass fabric, 35% jute mat, and 50% resin system, all measured by volume by following same method as described in Example 1.

Example 3

"C" Bio-Composite Product "Plate" Profile

"Plate" profile flat pultruded product having a cross section 8×1000 mm was manufactured with 10% unidirectional glass fabric, 45% jute mat, and 45% resin system, all measured by volume by following same method as described in Example 1.

Example 4

"D" Bio-Composite Product "Plate" Profile

"Plate" profile flat pultruded product having a cross section 8×1000 mm was manufactured with 20% bidirectional glass fabric, 24% jute mat, and 56% resin system, all measured by volume by following same method as described in Example 1.

Example 5

"E" Bio-Composite Product "Plate" Profile

"Plate" profile flat pultruded product having a cross section 8×1000 mm was manufactured with 15% bidirectional glass fabric, 35% jute mat, and 50% resin system, all measured by volume by following same method as described in Example 1.

Example 6

"F" Bio-Composite Product "Plate" Profile

"Plate" profile flat pultruded product having a cross section 8×1000 mm was manufactured with 10% bidirectional glass fabric, 45% jute mat, and 45% resin system, all measured by volume by following same method as described in Example 1.

Example 7

"G" Bio-Composite Product "Plate" Profile

"Plate" profile flat pultruded product having a cross section 8×1000 mm was manufactured with 30% polyester fabric, 14% jute mat, and 56% resin system, all measured by volume by following same method as described in Example 1.

Example 8

"H" Bio-Composite Product "Plate" Profile

"Plate" profile flat pultruded product having a cross section 8×1000 mm was manufactured with 25% polyester fabric, 25% jute mat, and 50% resin system, all measured by volume by following same method as described in Example 1.

Example 9

"I" Bio-Composite Product "Plate" Profile

"Plate" profile flat pultruded product having a cross section 8×1000 mm was manufactured with 20% polyester fabric, 35% jute mat, and 45% resin system, all measured by volume by following same method as described in Example 1.

The Plate profile bio-composite products prepared according to examples 1 to 9 were analyzed for its density, modulus of elasticity, modulus of rupture and impact strength and the results of the same are tabulated in Table 2.

These bio-composite pultruded products obtained according to examples 1 to 9, wherein increasing Jute amount and reducing synthetic fabric leads to significant reduction in density as well as in weight. It also leads to a significant reduction in cost. The present bio-composite products are encapsulated by fabrics in the peripheral area that brings more integrated uniformity of jute materials and leads to increase in stiffness of the product.

Example 10

"AA" Bio-Composite Product "I" Profile

"I" profile flat pultruded product having dimension of 20 mm thick of I-beam of flange with width of 70 mm and height of 120 mm was manufactured with 10% unidirectional glass fabric, 30% of bagasse; 14% jute mat, and 46% resin system, all measured by volume. A jute mat having weight of 4000 g/m2, a density of about 100 kg/m3 and a thickness of 20 mm was used here (manufactured at Dindayal Gupta Pvt ltd, Kolkata).

14% by vol. of Jute mats of 4000 GSM was provided from roller means (16 and 17) and 10% by vol. of unidirectional glass fabric (200 g/m2) was provided from roller mean (15 and 18). These fibres were passed through IR heater (19, 20) at speed of 4 meter per hour to reduce moisture to 3 to 4%. After reducing the moisture, the said fibres were impregnated by passing through resin bath (21, 22) comprising resin system consisting of 100 parts of Polyester (82% by vol. of unsaturated polyester in styrene supplied by Satyen Polymers Pvt. Ltd), 0.2 parts of cobalt octoate, 1.5 parts of Benzyl Peroxide, 2 parts of Calcium Carbonate, and 10 parts of Methanol. These impregnated fibres with the resin system were passed at speed of 4 meter per hour through preforming die "A" (23, 24) under pressure using pressurising means (25,26) to obtain squeezed fibres impregnated with the resin system. The squeezed resin impregnated fibres were transferred to preforming die "B" (27).

A plank of 15 mm thick and 1800 g/m2 basis weight was prepared from short fibres of bagasse by extruding 30% by vol. of short fibres of bagasse premixed with the resin system (i.e. 100 parts of Polyester (82% by vol. of unsaturated polyester in styrene supplied by Satyen Polymers Pvt. Ltd), 0.2 parts of Cobalt Octoate, 1.5 parts of Benzyl Peroxide, 2 parts of Calcium Carbonate, and 10 parts of Methanol) in equal proportion using the screw extruder (28) comprises supplying short fibres of bagasse through a hopper (30) to a barrel (29) having a screw (31) along its longitudinal axis and extruding it at rotational speed of 20-30 RPM with 10 L/D ratio into plank. The extruded

TABLE 2

| Fabrics Type | Volume % | | | Bio-composite product | Density kg/m3 | Modulus of Elasticity Gpa | Modulus of Rupture Mpa | Impact Strength |
| --- | --- | --- | --- | --- | --- | --- | --- | --- |
| | Synthetic Fabrics Reinforcement | Jute | Resin system | | | | | |
| Unidirectional Glass Fabric | 20 | 24 | 56 | A | 1,700 | 22 | 582 | 25 |
| | 15 | 35 | 50 | B | 1,580 | 26 | 525 | 29 |
| | 15 | 45 | 45 | C | 1,480 | 30.5 | 480 | 28 |
| Bidirectional Glass Fabric | 20 | 24 | 56 | D | 1,700 | 18.4 | 619 | 30 |
| | 15 | 35 | 50 | E | 1,410 | 27.8 | 528 | 27 |
| | 10 | 45 | 45 | F | 1,310 | 33.5 | 512 | 29 |
| Polyester Fabrics | 30 | 14 | 56 | G | 1,580 | 22.5 | 450 | 29 |
| | 25 | 25 | 50 | H | 1,480 | 24 | 435 | 25 |
| | 20 | 35 | 45 | I | 1,400 | 24.2 | 410 | 25 | bagasse plank was transferred from the screw extruder (28) to a preforming die "B" (27).

The extruded bagasse plank and two squeezed fibres impregnated with resin system were passed at speed of 4 meter per hour through the said preforming die "B" (27), having dimension of 20 mm thick of I-beam of flange with width 70 mm and height of 120 mm, under heating at temperature 80° C. using heating means (33), said two squeezed fibres were positioned above and below the extruded bagasse plank so as to encapsulate the bagasse plank between jute impregnated with the resin system which was further encapsulated by bi-directionally oriented E-glass fabric impregnated with resin system and obtain precured "I" profile preform of encapsulated bio-composite product.

The precured "I" profile preform was finally passed at speed of 4 meter per hour through pultrusion die (34) under heating at temperature 170° C. using heating means (35) so as to obtain cured "I" profile bio-composite pultruded product and expel it as it was activable under heating. The cured pultruded bio-composite product was pulled out by external pultrusion puller (36).

Example 11

"AB" Bio-Composite Product "I" Profile

"I" profile flat pultruded product having dimension of 20 mm thick of I-beam of flange with width 70 mm and height of 120 mm was manufactured with 10% of bidirectional glass fabric, 25% of bagasse, 15% of jute mat, and 50% of resin system, all measured by volume by following same method as described in Example 10 except replacing unidirectional glass fabric with bidirectional glass fabric.

Example 12

"AC" Bio-Composite Product "I" Profile

"I" profile flat pultruded product having dimension of 20 mm thick of I-beam of flange with width 70 mm and height of 120 mm was manufactured with 10% of basalt fabric, 15% of bagasse, 25% jute mat, and 50% of resin system, all measured by volume by following same method as described in Example 10 except replacing unidirectional glass fabric with Basalt fabric.

Example 13

"AD" Bio-Composite Product "I" Profile

"I" profile flat pultruded product having dimension of 20 mm thick of I-beam of flange with width 70 mm and height of 120 mm was manufactured with 10% of polyester fabric, 20% of bagasse, 14% of jute mat, and 56% of resin system, all measured by volume by following same method as described in Example 10 except replacing unidirectional glass fabric with polyester fabric.

Example 14

"AE" Bio-Composite Product "I" Profile

"I" profile flat pultruded product having dimension of 20 mm thick of I-beam of flange with width 70 mm and height of 120 mm was manufactured with 10% of aramid fabric, 25% of bagasse, 15% of jute mat, and 50% resin system, all measured by volume by following same method as described in Example 10 except replacing unidirectional glass fabric with Aramid fabric.

Example 15

"AF" Bio-Composite Product "I" Profile

"I" profile flat pultruded product having dimension of 20 mm thick of I-beam of flange with width 70 mm and height of 120 mm was manufactured with 10% of carbon fabric, 10% of bagasse, 35% of jute mat, and 45% of resin system, all measured by volume by following same method as described in Example 10 except replacing unidirectional glass fabric with Carbon fabric.

The I profile bio-composite products prepared according to examples 10 to 15 were analyzed for its density, modulus of elasticity, modulus of rupture and impact strength and the results of the same are tabulated in Table 4.

TABLE 4

| Fabrics Type | Volume % | | | | Density kg/m³ | Modulus of Elasticity Gpa | Modulus of Rupture Mpa | Impact Strength |
|---|---|---|---|---|---|---|---|---|
| | Bagasse | Jute | Polyester Resin | Bio-composite product | | | | |
| Unidirectional Glass Fabric 10% V/V | 30 | 14 | 46 | "AA" | 1,700 | 25 | 582 | 25 |
| Bidirectional Glass Fabric 10% V/V | 25 | 15 | 50 | "AB" | 1,580 | 26 | 638 | 29 |
| Basalt 10% V/V | 15 | 25 | 50 | "AC" | 1,480 | 30.5 | 752 | 28 |
| Polyester 10% V/V | 20 | 14 | 56 | "AD" | 1,700 | 18.4 | 371 | 30 |
| Aramid 10% V/V | 25 | 15 | 50 | "AE" | 1,410 | 27.8 | 428 | 27 |
| Carbon 10% V/V | 10 | 35 | 45 | "AF" | 1,310 | 33.5 | 752 | 29 |

These bio-composite pultruded products obtained according to examples 10 to 15 leads to a significant reduction in weight as well as in density because of incorporation of bagasse as a core. This also leads to a significant cost reduction. The glass fabric was distributed at top and bottom over jute mat which is covering preformed bagasse at the center part of the product. The present bio-composite products are encapsulated by fabrics in the peripheral area brings more integrity uniformity of jute materials and leads to increases in stiffness and tensile strength.

These products of examples 10 to 15 were also analyzed for their tensile Strength, Drop resistance, Thermal Degradation, Low Temperature performance, UV Resistance Performance, Water Absorption, Water Resistance, No. of Cyclic use and the results of the same were tabulated in the table 5.

The properties of conventional product of wood framework, bamboo framework and conventional jute fiber composites used as shuttering Plywood and I and Plate beam for civil application were listed in Table 6.

TABLE 5

| Sr. No. | Property | Unit | "AA" | "AB" | "AC" | "AD" | "AE" | "AF" |
|---|---|---|---|---|---|---|---|---|
| 1 | Tensile Strength | MPa | 60 | 65 | 63 | 75 | 75 | 82 |
| 2 | Drop resistance | Times | ≥50 | | | | | |
| 3 | Thermal degradation | 0° C. | >370° C. | | | | | |
| 4 | Low temperature performance | −20° C., 0.5 kg drop from 1 m | Not Broken | | | | | |
| 5 | UV resistance performance | % change | ≥2 | | | | | |
| 6 | Water absorption | % | 72 hrs 70° C. ≤0.2 | | | | | |
| 7 | Water resistance | Visual observation | delaminating and no blister observed | | | | | |
| 8 | No of cyclic use | Time | ≥70 | | | | | |

TABLE 6

| Sr. No. | Property | Unit | Wood framework | Bamboo framework | Conventional jute fibre composites |
|---|---|---|---|---|---|
| 1 | Tensile Strength | MPa | 30 | 35 | 58 |
| 2 | Flexural strength | MPa | 20 | 50 | 120 |
| 3 | Drop resistance | Times | <10 | <10 | ≥30 |
| 4 | Thermal degradation | 0° C. | 300 | 300 | ≥300 |
| 5 | Low temperature performance | −20° C. 0.5 kg drop | — | — | Broken |
| 6 | Hardness | R | — | — | ≥100 |
| 7 | Impact strength | KJ/m² | ≥60 | ≥60 | ≥60 |
| 8 | UV resistance performance | % change | — | — | ≥7 |
| 9 | Water absorption | % | — | — | 24 hrs ≤ 0.2 |
| 10 | Water resistance | Visual observation | — | — | — |
| 11 | No of cyclic use | Time | ≥10 | ≥10 | ≥50 |

According to the comparative results of products of examples 10 to 15 as described in Table 5 and conventional products as described in Table 6, the products of the invention have superior performance over the conventional one.

It has been found that the bio-composite products of the present invention is hybrid products with substantial technical advancements. The current invention has following advantages:
1. Low cost;
2. Easy processing system;
3. High toughening strength i.e. High Impact strength;
4. High Isotropic strength than conventional natural fibre composites;
5. Less fatigue (i.e. more durable);
6. Good tensile strength;
7. Comparable strength as that of glass fibre composites; and
8. utilizes 40% waste materials and hence eco-friendly.

The results illustrated in all five tables unequivocally establish the superior traits of composite products prepared in accordance with the present invention as compared to conventional composite products. These products of the invention with technical advancement are used as shuttering Plywood, 'I' and 'Plate' beam for civil application.

I claim:

1. A continuous pultrusion method for production of bio-composite pultruded products, the process comprising:
   rolling natural fibers including at least one of, hemp, jute, sisal, and flax, rolling fabric including at least one of, polyester, carbon, aramid, glass, and basalt, and passing the fibers and fabric through an IR heater at a speed of 2 to 6 meters per hour so as to reduce moisture in the fibers and fabric;
   passing the fibers and fabric at a speed of 2 to 6 meters per hour through a resin bath including a resin system followed by passing the fibers and fabric at a speed of 2 to 6 meters per hour through a preforming die under heating at a temperature of 70 to 90 degrees C. to obtain a precured preform of squeezed resin system impregnated fibers and fabric;
   transferring the precured preform from the preforming die to a pultrusion die and passing the precured preform at a speed of 2 to 6 meters per hour through the pultrusion die under heating at a temperature of 160 to 180 degrees C. to obtain a cured pultruded bio-composite product; and
   pulling the cured pultruded bio-composite product from the pultrusion die with an external pultrusion puller,
   wherein,
      the cured pultruded bio-composite product consists essentially of,
         10 to 50% by volume of the natural fibers as a core impregnated with the resin system and encapsulated between the fabric,
         10 to 30% by volume of the fabric bi-directionally and/or uni-directionally oriented and impregnated with the resin system, and
         the resin system, and wherein,
      the cured pultruded bio-composite product has either an I profile or a plate profile.

2. The method of claim 1, wherein the cured pultruded bio-composite product comprises 10 to 50% by vol. of the natural fibers, 10 to 30% by vol. of the fabric, and 40 to 60% by vol. of the resin system.

3. The method of claim 1, wherein the natural fibers are dried jute waste needle punched mats of 2000-4000 GSM.

4. The method of claim 1, wherein the fabric is glass fabric.

5. The method of claim 1, wherein the resin system includes, a resin, and at least one of a, curing agent, accelerator, filler, thinner, and pigment.

6. The method of claim 5, wherein the resin is a thermosetting resin or a thermoplastic resin.

7. A continuous pultrusion method for production of a bio-composite pultruded product, the process comprising;
rolling natural fibers including at least one of, hemp, jute, sisal, and flax, rolling fabric including at least one of, polyester, carbon, aramid, glass, and basalt, and passing the fibers and fabric through an IR heater at a speed 2 to 6 meters per hour so as to reduce moisture in the fibers and fabric;
passing the fibers and fabric at a speed of 2 to 6 meters per hour through a resin bath including a resin system followed by passing the fibers and fabric at a speed of 2 to 6 meters per hour through a first preforming die using pressure to obtain squeezed fibers and fabric impregnated with the resin system and transferring the squeezed fibers and fabric to a second preforming die;
extruding short fibers of bagasse premixed with the resin system through a screw extruder having a rotational speed of 20-30 RPM with a 10 L/D ratio and transferring extruded bagasse plank produced from the screw extruder to the second preforming die;
encapsulating the extruded bagasse plank by passing the squeezed fibers and fabric and the bagasse plank at a speed of 2 to 6 meters per hour through the second preforming die under heating at a temperature of 70 to 90 degrees C. to obtain a precured preform of encapsulated bio-composite product; and
passing the precured preform of bio-composite product at a speed of 2 to 6 meters per hour through a pultrusion die under heating at a temperature of 160 to 180 degrees C. to obtain a cured bio-composite pultruded product and pulling out the cured bio-composite pultruded product by an external pultrusion puller, wherein,
the cured bio-composite pultruded product consists of,
10 to 30% by volume of the plank of short fibers of bagasse premixed with the resin system as a core encapsulated between the natural fibers,
10 to 40% by volume of the natural fibers impregnated with the resin system and encapsulated between the fabric,
5 to 10% by volume of the fabric bi-directionally and/or uni-directionally oriented and impregnated with the resin system, and
the resin system, and wherein,
the cured bio-composite pultruded product has either an I profile or a plate profile.

8. The method of claim 7, wherein the cured pultruded bio-composite product comprises 10 to 40% by vol. of the natural fibers, 5 to 10% by vol. of the fabric, 10 to 30% by vol. of the bagasse short fibers, and 40 to 60% by vol. of the resin system.

9. The method of claim 7, wherein the natural fibers are dried jute waste needle punched mats of 2000-4000 GSM.

10. The method of claim 7, wherein the fabric is glass fabric.

11. The method of claim 7, wherein the bagasse are premixed with the resin system prior to extrusion in equal proportion.

12. The method of claim 7, wherein the resin system includes, a resin, and at least one of a curing agent, an accelerator, a filler, a thinner, and a pigment.

13. The method of claim 12, wherein the resin is a thermosetting resin or a thermoplastic resin.

* * * * *